(12) United States Patent
Feng et al.

(10) Patent No.: US 9,834,671 B2
(45) Date of Patent: Dec. 5, 2017

(54) CURABLE EPOXY COMPOSITION AND A COMPOSITE MADE THEREFROM

(71) Applicant: Dow Global Technologies LLC, Midland, MI (US)

(72) Inventors: Yanli Feng, Shanghai (CN); Lejun Qi, Shanghai (CN); Yi Zhang, Shanghai (CN); Wei Du, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 175 days.

(21) Appl. No.: 14/436,189

(22) PCT Filed: Nov. 7, 2012

(86) PCT No.: PCT/CN2012/084233
§ 371 (c)(1),
(2) Date: Apr. 16, 2015

(87) PCT Pub. No.: WO2014/071576
PCT Pub. Date: May 15, 2014

(65) Prior Publication Data
US 2015/0284562 A1  Oct. 8, 2015

(51) Int. Cl.
| | | |
|---|---|---|
| *C08L 63/00* | (2006.01) | |
| *C08L 63/04* | (2006.01) | |
| *C08L 67/06* | (2006.01) | |
| *C08G 59/42* | (2006.01) | |
| *C08G 59/28* | (2006.01) | |
| *C08J 5/04* | (2006.01) | |
| *C08K 5/1539* | (2006.01) | |

(52) U.S. Cl.
CPC .............. *C08L 63/00* (2013.01); *C08G 59/42* (2013.01); *C08J 5/04* (2013.01); *C08L 63/04* (2013.01); *C08J 2363/00* (2013.01); *C08J 2463/00* (2013.01); *C08K 5/1539* (2013.01); *C08L 67/06* (2013.01); *C08L 2205/02* (2013.01)

(58) Field of Classification Search
CPC ................................ C08L 63/00; C08G 59/24
See application file for complete search history.

(56) References Cited

U.S. PATENT DOCUMENTS

| | | |
|---|---|---|
| 2,750,395 A | 6/1956 | Phillips et al. |
| 2,890,194 A | 6/1959 | Phillips et al. |
| 3,299,008 A * | 1/1967 | Mueller ............ C08G 59/4269 525/308 |
| 3,686,359 A | 8/1972 | Soldatos et al. |
| 3,954,712 A | 5/1976 | Lottanti et al. |
| 4,070,416 A | 1/1978 | Narahara et al. |
| 4,313,859 A | 2/1982 | Gardner |
| 4,314,930 A * | 2/1982 | Gardner ............... C08F 283/10 523/400 |
| 4,321,351 A | 3/1982 | Zuppinger et al. |
| 4,394,491 A | 7/1983 | Hoffman |
| 4,925,901 A | 5/1990 | Bertram et al. |
| 5,112,932 A | 5/1992 | Koenig et al. |
| 5,411,809 A | 5/1995 | Shalati et al. |
| 6,432,541 B1 | 8/2002 | Gan |
| 6,613,839 B1 | 9/2003 | Gan et al. |
| 8,021,586 B2 | 9/2011 | Verghese et al. |
| 8,691,920 B2 | 4/2014 | Li et al. |
| 8,871,892 B2 | 10/2014 | Marks |
| 8,912,291 B2 | 12/2014 | Gan et al. |
| 2007/0193767 A1 | 8/2007 | Guery et al. |
| 2009/0082486 A1 | 3/2009 | Bates et al. |
| 2010/0237292 A1 | 9/2010 | Gan et al. |

FOREIGN PATENT DOCUMENTS

| | | | |
|---|---|---|---|
| EP | 0028583 A2 | 5/1981 | |
| JP | 2012-87248 | 5/2012 | |
| WO | WO 2010121392 A1 * | 10/2010 | ............. C08G 59/24 |
| WO | WO 2011059633 A2 * | 5/2011 | ........... C08G 18/003 |

OTHER PUBLICATIONS

PCT/CN2012/084233, International Search Report & Written Opinion dated Aug. 15, 2013.
PCT/CN2012/084233, International Preliminary Report on Patentability dated May 21, 2015.

* cited by examiner

*Primary Examiner* — Randy Gulakowski
*Assistant Examiner* — Ha S Nguyen

(57) ABSTRACT

A curable epoxy resin composition including: (a) a cycloaliphatic epoxy resin, (b) an oxazolidone ring-containing epoxy resin, (c) a reaction product of (i) an anhydride compound and (ii) a polyol, and (d) an anhydride hardener; a process for preparing the curable epoxy resin composition; and a composite including a reinforcing fiber embedded in a thermoset resin, wherein the thermoset resin is a reaction product of the curable epoxy resin composition.

11 Claims, No Drawings

"CURABLE EPOXY COMPOSITION AND A COMPOSITE MADE THEREFROM"

FIELD OF INVENTION

The present invention relates to a curable epoxy resin composition. The present invention also relates to a process for preparing the composition and a composite comprising a reinforcing fiber embedded in a thermoset resin made from the composition.

BACKGROUND ART

Epoxy resin compositions have been widely used in a wide range of applications for their temperature resistance and mechanical properties such as tensile and flexural properties. Epoxy resin compositions are particularly useful for fiber-reinforced composites. Fiber-reinforced composites comprise cured epoxy resins as a polymer matrix with fibers (for example, glass fibers and carbon fibers) embedded therein.

Many applications for fiber-reinforced composites require a cured epoxy resin having high thermal resistance, that is, a glass transition temperature ($T_g$) of 160 degree Celsius (° C.) or higher. It is thus desirable to simultaneously increase mechanical properties such as tensile properties and flexural properties, while maintaining or increasing thermal resistance. In particular, it is desirable for the tensile elongation property of the cured epoxy resin to be high enough so that the polymer matrix formed therefrom will not break, before the fibers break which are embedded within the polymer matrix. However, increasing tensile elongation typically tends to decrease thermal resistance.

In addition, components in epoxy resin compositions must be compatible with each other to remain as a homogeneous composition throughout processing. A typical process for manufacturing fiber-reinforced composites comprises the steps of: loading a batch of an epoxy resin composition into a resin bath, drawing fibers through the epoxy resin composition in order to impregnate the fibers with the epoxy resin, and curing the resin impregnated in the fibers to form a fiber-reinforced composite. A typical residence time for an epoxy resin composition in a bath during processing can be eight hours or more at a processing temperature of from 20 to 45° C. The epoxy resin composition should remain a homogeneous mixture throughout that residence time. Thus, the components of the epoxy resin composition must be sufficiently compatible so as to remain homogeneous (that is, avoid phase separation) during the residence time in the bath. Incompatibility between the components of the epoxy resin composition results in phase separation during residence in the bath, typically causing the resulting fiber-reinforced composite to have one or more of the following undesirable properties: rough surface, inconsistent properties and/or a reduction of mechanical properties such as tensile and flexural properties.

Therefore, it is desirable to provide a curable epoxy resin composition, wherein the composition upon curing increases one or more of tensile properties, flexural properties and $T_g$ without concomitantly decreasing any of those properties significantly relative to a conventional technology. It is also desirable that the components of a curable epoxy resin composition have sufficient compatibility with each other so that the composition exhibits no phase separation for at least eight hours at 25° C. after mixing.

SUMMARY OF THE INVENTION

The present invention provides a curable epoxy resin composition that comprises a novel combination of the following components: (a) a cycloaliphatic epoxy resin, (b) an oxazolidone ring-containing epoxy resin, (c) a reaction product of (i) an anhydride and (ii) a polyol, and (d) an anhydride hardener.

Research leading to the present invention has revealed that an incumbent epoxy resin composition comprising a cycloaliphatic epoxy resin, an oxazolidone ring-containing epoxy resin, a conventional polyol toughening agent and an anhydride hardener, can afford a cured epoxy resin with high thermal resistance ($T_g$), but this epoxy resin composition phase separated within 8 hours at 25° C. after mixing. Comparative Example A, herein below, demonstrates this observation.

When the conventional polyol toughening agent is replaced with the component (c) described above, the curable epoxy resin composition of the present invention surprisingly exhibits no phase separation for at least eight hours at 25° C. after mixing. Upon curing, the curable epoxy resin composition of the present invention also exhibits higher flexural stress, flexural strain and/or tensile elongation than incumbent epoxy resin compositions that do not contain component (b) and/or (c). At the same time, the curable epoxy resin composition has $T_g$ comparable to the incumbent epoxy resin compositions upon curing.

In a first aspect, the present invention includes a curable epoxy resin composition comprising: (a) a cycloaliphatic epoxy resin, (b) an oxazolidone ring-containing epoxy resin, (c) a reaction product of (i) an anhydride compound and (ii) a polyol, and (d) an anhydride hardener.

In a second aspect, the present invention includes a process for preparing the above curable epoxy resin composition of the first aspect, wherein the process comprises admixing (a) a cycloaliphatic epoxy resin, (b) an oxazolidone ring-containing epoxy resin, (c) a reaction product of (i) an anhydride compound and (ii) a polyol, and (d) an anhydride hardener.

In a third aspect, the present invention is a composite comprising a reinforcing fiber embedded in a thermoset resin, wherein the thermoset resin is a reaction product of the curable epoxy resin composition of the first aspect.

DESCRIPTION OF THE EMBODIMENTS

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International, and ISO refers to International Organization for Standards.

"And/or" means "and, or as an alternative". All ranges include endpoints unless otherwise indicated.

The curable epoxy resin composition of the present invention comprises at least one or more cycloaliphatic epoxy resin. The cycloaliphatic epoxy resin useful in the present invention includes for example a hydrocarbon compound containing at least one non-aryl hydrocarbon ring structure and containing at least one epoxy group. The epoxy group in the cycloaliphatic epoxy resin may include, for example, an epoxy group fused to the ring structure and/or an epoxy group residing on an aliphatic substituent of the ring structure. The cycloaliphatic epoxy resin may be a monoepoxide compound. Preferably, the cycloaliphatic epoxy resin has two or more epoxy groups. The cycloaliphatic epoxy resin may include cycloaliphatic epoxides modified with glycols.

Mixtures of two or more cycloaliphatic epoxy resins may be used in the present invention.

The cycloaliphatic epoxy resin in the curable epoxy resin composition may have an epoxy group fused to the non-aryl hydrocarbon ring structure, which is a saturated carbon ring having an epoxy oxygen bonded to two vicinal atoms in the carbon ring. Cycloaliphatic epoxy resins, for example, those described in U.S. Pat. No. 3,686,359, may be used in the present invention.

Examples of suitable cycloaliphatic epoxy resins useful in the present invention include, diepoxides of cycloaliphatic esters of dicarboxylic acids, such as bis(3,4-epoxycyclohexylmethyl)oxalate; bis(3,4-epoxycyclohexylmethyl)adipate; bis(3,4-epoxy-6-methylcyclohexylmethyl)adipate; bis(3,4-epoxycyclohexylmethyl)pimelate; vinylcyclohexene diepoxide; 3,4-epoxycyclohexylmethyl-3,4-epoxycyclohexane carboxylate; limonene diepoxide; bis[(3,4-epoxycyclohexyl)methyl]dicarboxylates; bis[(3,4-epoxy-6-methylcyclohexyl) methyl]dicarboxylates; glycidyl 2,3-epoxycyclopentyl ether; cyclopentenyl ether diepoxide; 2,3-epoxycyclopentyl-9,10-epoxystearate; 4,5-epoxytetrahydrophthalic acid diglycidyl ester; bis(2,3-epoxycyclopentyl)ether; 2-(3,4-epoxycyclohexyl)-5,5-spiro (2,3-epoxycyclohexane)-m-dioxane; 2-(3,4-epoxycyclohexyl)-5,5-spiro(3,4-epoxycyclohexane)-m-dioxane; (3,4-epoxy-6-methylcyclohexyl)methyl 3,4-epoxy-6-methylcyclohexane; 1,2-bis(2,3-epoxycyclopentyl) ethane; dicyclopentadiene diepoxide and mixtures thereof. Other suitable diepoxides of cycloaliphatic esters of dicarboxylic acids include those described, for example, in U.S. Pat. No. 2,750,395.

Other cycloaliphatic epoxy resins useful in the present invention include for example 3,4-epoxycyclohexylmethyl-3,4-epoxycyclohexane carboxylate; 3,4-epoxy-1-methylcyclohexyl-methyl-3,4-epoxy-methylcyclohexane carboxylate; 6-methyl-3,4-epoxycyclohexylmethylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexyl-methyl-3,4-epoxy-3-methylcyclohexane carboxylate; 3,4-epoxy-5-methylcyclohexyl-methyl-3,4-epoxy-5-methylcyclohexane carboxylate; di- or polyglycidyl ethers of cycloaliphatic polyols such as 2,2-bis(4-hydroxycyclohexyl) propane; and mixtures thereof. Other suitable 3,4-epoxycyclohexylmethyl-3,4-epoxycyclohexane carboxylates useful in the present invention include those described, for example, in U.S. Pat. No. 2,890,194.

Suitable commercially available cycloaliphatic epoxy resins useful in the present invention include for example ERL™ 4221 epoxy resin (ERL is a trademark of The Dow Chemical Company) available from The Dow Chemical Company. In addition, other cycloaliphatic epoxy resins available under the trade name designations ERL, D.E.R. and D.E.N., all available from The Dow Chemical Company may also be used.

The amount of the cycloaliphatic epoxy resin in the curable epoxy resin composition can be 60 weight-percent (wt %) or more, 70 wt % or more, or even 75 wt % or more. At the same time, the amount of the cycloaliphatic epoxy resin in the curable epoxy resin composition can be 95 wt % or less, 90 wt % or less, or even 85 wt % or less. Wt % of the cycloaliphatic epoxy resin is based on the total weight of epoxy resins in the curable epoxy resin composition. If the amount of the cycloaliphatic epoxy resin is lower than 60 wt %, the viscosity of the curable epoxy resin composition may be undesirably high for use in a pultrusion process. If the amount of the cycloaliphatic epoxy resin is higher than 95 wt %, the tensile elongation of cured epoxy resins made therefrom may be undesirably lower than 2%.

The curable epoxy resin composition of the present invention also comprises one or more oxazolidone ring-containing epoxy resin. The oxazolidone ring-containing epoxy resin useful in the present invention may comprise an epoxy resin having a structure of the following Formula (I):

where R is hydrogen or a methyl group.

The oxazolidone ring-containing epoxy resin used herein may comprise for example a reaction product of at least one epoxy resin and at least one isocyanate compound. Such epoxy resins are described in for example U.S. Pat. No. 5,112,932; and PCT Patent Application publications WO2009/045835, WO2011/087486 and WO2011/059633.

The epoxy resin useful for preparing the oxazolidone ring-containing epoxy resin may comprise an aliphatic epoxy resin, an aromatic epoxy resin, or combination of an aliphatic epoxy resin and an aromatic epoxy resin.

Examples of the aliphatic epoxy resins used to prepare the oxazolidone ring-containing epoxy resin include polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers, and mixtures thereof. Some particular examples of the aliphatic epoxy resins used to prepare the oxazolidone ring-containing epoxy resin include, glycidyl ethers of polyols such as 1,4-butanediol diglycidyl ether and 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol or a diglycidyl ether of polypropylene glycol; polyglycidyl ethers of polyether polyols obtained by adding one type, or two or more types, of alkylene oxide to aliphatic polyols such as propylene glycol, trimethylol propane and glycerin; diglycidyl esters of aliphatic long-chain dibasic acids; and mixtures thereof. A combination of aliphatic epoxy resins may be used in the present invention.

Examples of the aromatic epoxy resins used to prepare the oxazolidone ring-containing epoxy resin include diglycidyl ethers of polyphenols such as hydroquinone; resorcinol; bisphenol A; bisphenol F; 4,4'-dihydroxybiphenyl; novolac; tetrabromobisphenol A; 2,2-bis(4-hydroxyphenyl)-1,1,1,3,3,3-hexafluoropropane; 1,6-dihydroxynaphthalene; and mixtures thereof. A combination of aromatic epoxy resins may be used in the present invention.

The isocyanate compound used to prepare the oxazolidone ring-containing epoxy resins may be aromatic, aliphatic, cycloaliphatic, or mixtures thereof. The isocyanate compound may comprise for example a polymeric isocyanate. The isocyanate compound may be used herein as a mixture of two or more of isocyanates. The isocyanate compound may also be any mixture of the isomers of an isocyanate, for example a mixture of 2,4- and 2,6-isomers of diphenylmethane diisocyanate (MDI) or a mixture of any 2,2'-, 2,4'- and 4,4'-isomers of toluene diisocyanate (TDI).

The isocyanate compound used to prepare the oxazolidone ring-containing epoxy resins preferably comprises a diisocyanates and/or polymeric isocyanates. Diisocyanates include for example aromatic diisocyanates and aliphatic diisocyanates. Examples of aromatic diisocyanates or polymeric isocyanates useful in the present invention include 4,4'-MDI; TDI such as 2,4-toluene diisocyanate and 2,6-toluene diisocyanate; xylene diisocyanate (XDI); and isomers thereof. Examples of aliphatic diisocyanates useful in the present invention include hexamethylene diisocyanate (HMDI); isophorone diisocyanate (IPDI); 4,4'-methylenebis (cyclohexylisocyanate); trimethyl hexamethylene diisocyanate; and isomers thereof. A combination of diisocyanates may be used in the present invention. A combination of polymeric isocyanates may also be used in the present invention. Suitable commercially available diisocyanates and polymeric isocyanates useful in the present invention may include for example ISONATE™ M124 (ISONATE is a trademark of The Dow Chemical Company), ISONATE M125, ISONATE OP 50, PAPI™ 27 (PAPI is a trademark of The Dow Chemical Company), VORONATE™ M229 (VORONATE is a trademark of The Dow Chemical Company), VORANATE T-80 isocyanates, all available from The Dow Chemical Company, and mixtures thereof.

The oxazolidone ring-containing epoxy resin useful in the present invention is desirably a reaction product of an aromatic epoxy resin and an isocyanate compound. Suitable commercially available oxazolidone ring-containing epoxy resins useful in the present invention may include for example D.E.R.™ 858 resin (D.E.R. is a trademark of The Dow Chemical Company) available from The Dow Chemical Company, ARALDITE™ 28389 and ARALDITE 28380 resins (ARALDITE is a trademark of Huntsman Advanced Materials) available from Huntsman, EPON™ 1194 and EPON 1195 resins (EPON is a trademark of Momentive Specialty Chemicals Inc.) available from Momentive, and mixtures thereof.

The amount of the oxazolidone ring-containing epoxy resin in the curable epoxy resin composition may be 5 wt % or more, 10 wt % or more, or even 15 wt % or more. The maximum amount of the oxazolidone ring-containing epoxy resin in the curable epoxy resin composition may be up to 35 wt %. Generally, the amount of the oxazolidone ring-containing epoxy resin may be 35 wt % or less, 30 wt % or less, or even 25 wt % or less. Wt % of the oxazolidone ring-containing epoxy resin is based on the total epoxy resin weight in the curable epoxy resin composition. If the amount of the oxazolidone ring-containing epoxy resin is lower than 5 wt %, the tensile elongation of cured epoxy resins made therefrom may be lower than 2%. If the amount of the oxazolidone ring-containing epoxy resin is higher than 35 wt %, the viscosity of the curable epoxy resin composition may be undesirably high for use in a pultrusion process.

The curable epoxy resin composition of the present invention also comprises at least one anhydride hardener (also referred to as a curing agent or cross-linking agent), or blends of two or more anhydride hardeners. The anhydride hardener useful in the present invention may comprise for example cycloaliphatic anhydrides, aromatic anhydrides, and mixtures thereof. Representative anhydride hardeners useful in the present invention may include, for example, phthalic acid anhydride and derivatives thereof, nadic acid anhydride and derivatives thereof, trimellitic acid anhydride and derivatives thereof, pyromellitic acid anhydride and derivatives thereof, benzophenonetetracarboxylic acid anhydride and derivatives thereof, dodecenyl succinic acid anhydride and derivatives thereof, and poly(ethyloctadecanedioic acid) anhydride and derivatives thereof. The above anhydride hardeners can be used alone or in an admixture thereof.

Particularly suitable anhydride hardeners for the present invention include for example hexahydrophthalic anhydride (HHPA); methyl hexahydrophathalic anhydride (MBHPA); tetrahydrophthalic anhydride (THPA); methyl tetrahydrophthalic anhydride (MTHPA); nardic maleic anhydride (NMA); nadic acid anhydride; methyl-(endo)-5-norbornene-2,3-dicarboxylic anhydride (METHPA); pyromellitic dianhydride; ciscyclopentanetetracarboxylic acid dianhydride; hemimellitic anhydride; trimellitic anhydride; naphthalene-1,8-dicarboxylic acid anhydride; phthalic anhydride; dichloromaleic anhydride; dodecenylsuccinic anhydride; glutaric anhydride; maleic anhydride; succinic anhydride; methyl nadic acid anhydride; and mixtures thereof. Anhydride hardeners may also include for example copolymers of styrene and maleic acid anhydrides and other anhydrides including for example those described in U.S. Pat. No. 6,613,839.

In general, the anhydride hardener useful in the present invention is used in an amount sufficient to cure the curable epoxy resin composition. A molar ratio of total epoxy resins to the hardener (including the anhydride hardener and additional hardeners if present) in the curable epoxy resin composition can be 50:1 or lower, 20:1 or lower, 10:1 or lower, or even 5:1 or lower. At the same time, the molar ratio of the total epoxy resins to the hardener can be 1:2 or higher, 1:1.5 or higher, 1:1.25 or higher, or even 1:1 or higher.

The curable epoxy resin composition of the present invention also comprises a reaction product of (i) an anhydride compound and (ii) a polyol ("Anhydride Reaction Product"). Preferably, the Anhydride Reaction Product contains carboxylic acid group(s). Hydroxyl groups of the polyol may react with the anhydride group(s) of the anhydride compound to form a half-ester, which comprises ester group(s) and carboxylic acid group(s). Upon curing the curable epoxy resin composition, carboxyl group(s) in the Anhydride Reaction Product can further react with epoxy group(s) of the epoxy resins to form a homogenously cured epoxy resin. Compared to the Anhydride Reaction Product containing carboxyl group(s), a conventional polyol has lower reactivity with the epoxy group(s) of epoxy resins. A cured epoxy resin made from a curable epoxy resin composition comprising the conventional polyol toughening agent usually still contains unreacted polyol, which tends to migrate to the surface of the cured epoxy resin. The curable epoxy resin composition of the present invention upon curing may be free from migration problems associated with the conventional polyol toughening agents. The Anhydride Reaction Product may have an acid value of 10 milligram potassium hydroxide per gram sample (mg KOH/g) or more, 30 mg KOH/g or more, or even 40 mg KOH/g or more. At the same time, the acid value of the Anhydride Reaction Product may be 90 mg KOH/g or less, 70 mg KOH/g or less, or even 60 mg KOH/g or less. The acid value, that is, the number of milligrams of KOH per gram of solid required to neutralize the acid functionality in a resin, is a measure of the amount of acid functionality. Acid value may be determined by the testing method described in the Examples below. The viscosity of the Anhydride Reaction Product may be 30,000 millipascal·seconds (mPa·s) or less, 20,000 mPa·s or less, or even 10,000 mPa·s or less, as determined by ASTM D-2196 at 25° C.

Suitable anhydride compounds used to prepare the Anhydride Reaction Product may include for example those anhydrides described above as the anhydride hardener used as component (d) of the curable epoxy resin composition. The anhydride compound used to prepare the Anhydride Reaction Product may be the same as or different from the anhydride hardener used as component (d) of the curable epoxy resin composition. The anhydride compound and the anhydride hardener may be independently selected from nardic maleic anhydride (NMA); methyltetrahydrophthalic anhydride (MTHPA); tetrahydrophthalic anhydride (THPA); methylhexahydrophthalic anhydride (MHHPA); hexahydrophthalic anhydride (HHPA); methyl-(endo)-5-norbornene-2,3-dicarboxylic anhydride; pyromellitic dianhydride; ciscyclopentanetetracarboxylic acid dianhydride; hemimellitic anhydride; trimellitic anhydride; naphthalene-1,8-dicarboxylic acid anhydride; phthalic anhydride; dichloromaleic anhydride; dodecenylsuccinic anhydride; glutaric anhydride; maleic anhydride; succinic anhydride and mixtures thereof.

The polyol used to prepare the Anhydride Reaction Product may be for example any of polyols known in the art. The Anhydride Reaction Product can be prepared by a mixture of two or more polyols. For example, the polyol may be an aliphatic polyol. The aliphatic polyol may be selected, for example, from linear aliphatic polyols and branched aliphatic polyols.

Generally, the polyol used to prepare the Anhydride Reaction Product may have a nominal functionality (average number of hydroxyl (OH) groups per molecule) of 2 or more, or 3 or more. At the same time, the polyol may have a nominal functionality of 10 or less, 8 or less, or even 6 or less.

The polyol used to prepare the Anhydride Reaction Product may have an average hydroxyl number ranging generally from 20 to 10,000 milligrams potassium hydroxide per gram of polyol (mg KOH/g), ranging from 30 to 3,000 mg KOH/g, ranging from 150 to 1,500 mg KOH/g, or even ranging from 180 to 800 mg KOH/g.

Examples of suitable polyols used to prepare the Anhydride Reaction Product may include polyether polyols, polyester polyols, polyhydroxy-terminated acetal resins, polyalkylene carbonate-based polyols, hydroxyl-terminated amines, hydroxyl-terminated polyamines; and mixtures thereof. Examples of the above polyols and other suitable polyols are described more fully, for example, in U.S. Pat. No. 4,394,491. The polyol may also include a polymer polyol. The polyol useful in the present invention can comprise any one or combination of more than one of the polyols. Suitable commercially available polyols useful in the present invention may include for example VORANOL™ 280 (VORANOL is a trademark of The Dow Chemical Company), VORANOL CP 6001, VORANOL 8000LM polyols, all available from The Dow Chemical Company, and mixtures thereof. The polyols used to prepare the Anhydride Reaction Product may include at least one of polyoxyalkylene polyol having an equivalent weight in a range of from 20 to 2,500. Such polyols may have a combined nominal functionality of from 2 to 10. The polyols may include for example poly(propylene oxide) homopolymers, poly(ethylene oxide) homopolymers, random copolymers of propylene oxide and ethylene oxide, ethylene oxide-capped poly(propylene oxide) homopolymers, ethylene oxide-capped random copolymers of propylene oxide and ethylene oxide, and mixtures thereof. The polyol may desirably comprise a poly(propylene oxide) polyol.

The polyol used to prepare the Anhydride Reaction Product may be an amphiphillic block copolymer, which has at least one hydroxyl functional group. The amphiphilic block copolymer may comprise a blend of two or more amphiphilic block copolymers. The amphiphilic block copolymer may include at least two kinds of block segments, one block segment is miscible with epoxy resins and the other block segment is immiscible with epoxy resins.

The miscible block segment of the amphiphilic block copolymer may contain a propylene oxide block, a poly (ethylene oxide-co-propylene oxide) block, or preferably a polyethylene oxide block. The immiscible block segment of the amphiphilic block copolymer may comprise at least one polyether structure containing at least one or more alkylene oxide monomer units having at least four carbon atoms, such as a polyhexylene oxide block, a polydodecylene oxide block, a polyhexadecylene oxide block, or preferably a polybutylene oxide block. Generally, the molar ratio of the miscible segments of the amphiphilic block copolymer to the immiscible segments of the amphiphilic block copolymer may be from 10:1 to 1:10.

The amphiphilic block copolymer used to prepare the Anhydride Reaction Product is preferably selected from the group consisting of a diblock, a linear triblock, a linear tetrablock, a higher order multiblock structure; a branched block structure; or a star block structure.

Suitable amphiphilic block copolymers to prepare the Anhydride Reaction Product include amphiphillic polyether diblock copolymers such aspoly(ethylene oxide)-b-poly(butylenes oxide) (PEO-b-PBO), or amphiphilic polyether triblock copolymers such as poly(ethylene oxide)-b-poly(butylene oxide)-b-poly(ethylene oxide) (PEO-b-PBO-b-PEO). Preferably, the amphiphilic block copolymers are PEO-b-PBO, PEO-b-PBO-b-PEO and a mixture of PEO-b-PBO and PEO-b-PBO-b-PEO.

Other suitable amphiphilic block copolymers useful in the present invention include poly(ethylene oxide)-b-poly(ethylene-alternating propylene) (PEO-PEP), poly(ethylene propylene-b-ethylene oxide) block copolymers (PEP-b-PEO), poly(butadiene-b-ethylene oxide) block copolymers (PB-b-PEO) and mixtures thereof. Suitable commercially available amphiphillic block copolymer may include for example FORTEGRA™ 100 block copolymers available from The Dow Chemical Company (FORTEGRA is a trademark of The Dow Chemical Company).

The polyol used to prepare the Anhydride Reaction Product may desirably have a number average molecular weight of generally from 1,000 to 20,000 gram per mole, from 4,000 to 16,000 gram per mole, or even from 6,000 to 15,000 gram per mole. If the number average molecular weight of the polyol is lower than 1,000, the curable epoxy resin composition may not be able to provide cured epoxy resins with high thermal resistance.

The Anhydride Reaction Product in the curable epoxy resin composition can be prepared by conventional methods. For example, the reaction can be conducted at a temperature of 60° C. or more, 80° C. or more, or even 100° C. or more. At the same time, the reaction temperature can be 160° C. or less, 140° C. or less, or even 120° C. or less. In preparing the Anhydride Reaction Product, the mole ratio of the anhydride compound to the polyol may be from 20 to 1, from 10 to 1, or even one. Preferably, the polyol is fully reacted with the anhydride compound. The content of unreacted polyol existed in the Anhydride Reaction Product obtained is desirably less than 5,000 parts per million (ppm), less than 4,000 ppm, less than 1,000 ppm, or even zero ppm, so as to minimize adverse effects of the unreacted polyol on the compatibility between components of the curable epoxy resin composition. The anhydride compound may react with the polyol in the presence of a catalyst, for example, an amine catalyst. Suitable amine catalysts include for example benzyldimethylamine, triethylamine, diethyl aminopropylamine or mixtures thereof.

In general, the concentration of the Anhydride Reaction Product in the curable epoxy resin composition may be 1 wt % or more, 2 wt % or more, or even 5 wt % or more. At the same time, the concentration of the Anhydride Reaction Product in the curable epoxy resin composition may be 20 wt % or less, 15 wt % or less, or even 10 wt % or less. Wt % of the Anhydride Reaction Product is based on the total weight of the curable epoxy resin composition. If the concentration of the Anhydride Reaction Product is lower than 1 wt %, the tensile and/or flexural properties of cured epoxy resins made therefrom may be compromised. If the concentration of the Anhydride Reaction Product is higher than 20 wt %, cured epoxy resins may not be able to achieve high thermal resistance.

The curable epoxy resin composition of the present invention may optionally comprise a catalyst. The catalyst may be used to promote the reaction between the epoxy resins and the anhydride hardener. Catalysts useful in the present invention may include for example a Lewis acid such as boron trifluoride, and a derivative of boron trifluoride with an amine such as piperidine or methyl ethylamine. The catalysts may also be basic such as an imidazole or an amine. Other catalysts useful in the present invention may include for example other metal halide Lewis acids such as stannic chloride, zinc chloride and mixtures thereof, metal carboxylate-salts such as stannous octoate, amines including tertiary amines such as triethylamine, diethyl aminopropylamine, benzyl dimethy amine, tris(dimethylaminomethyl)phenol and mixtures thereof, imidazole derivatives such as 2-methylimidazole, 1-methylimidazole, benzimidazole and mixtures thereof, onium compounds such as ethyltriphenyl phosphonium acetate and ethyltriphenyl phosphonium acetate-acetic acid complex, and combinations thereof. Any of the well-known catalysts described in U.S. Pat. No. 4,925,901 may also be used in the present invention.

The catalysts, when present in the curable epoxy resin composition, are employed in a sufficient amount to result in a substantially complete cure of the curable epoxy resin composition, with at least some cross-linking. For example, the catalyst, when used, may be used in an amount of from 0.01 to 5 parts per hundred parts (phr) by weight of total epoxy resins in the curable epoxy resin composition, from 0.1 to 4 phr, or even from 0.2 phr to 3 phr.

The curable epoxy resin composition of the present invention may optionally comprise an additional epoxy resin. The additional epoxy resin (or "second epoxy") useful in the present invention may be any type of epoxy resins, including any material containing one or more reactive oxirane groups, referred to herein as "epoxy groups" or "epoxy functionality". The additional epoxy resin may include for example mono-functional epoxy resins, multi- or poly-functional epoxy resins, and combinations thereof. The additional epoxy resins may be pure compounds, but are generally mixtures or compounds containing one, two or more epoxy groups per molecule. The additional epoxy resin may also be for example monomeric or polymeric. The additional epoxy resins may also include for example reactive —OH groups, which may react at higher temperatures with anhydrides, organic acids, amino resins, phenolic resins, or with epoxy groups (when catalyzed) to result in additional crosslinking.

Examples of the additional epoxy resins useful in the present invention may include epoxy phenolic novolac resins, cresol novolac type epoxy resins, multifunctional (poly-epoxy) epoxy resins, bisphenol A-based epoxy resins, bisphenol F-based epoxy resins, and mixtures thereof. Suitable additional epoxy resins include for example those commercially available under the tradenames D.E.N. 431, D.E.N. 438, D.E.R. 332, D.E.R. 383, D.E.R. 331, D.E.R. 354 and D.E.R. 354LY available from The Dow Chemical Company and mixtures thereof.

Generally, the additional epoxy resin, if present, may be used in an amount that does not compromise or deleteriously affect the properties of cured epoxy resins made therefrom. For example, the amount of the additional epoxy resin used herein may be generally 10 wt % or less, 5 wt % or less, or even 1 wt % or less of the total epoxy resin weight in the curable epoxy resin composition. If the amount of the additional epoxy resins is higher than 10 wt %, $T_g$ of cured epoxy resins made therefrom may be lower than 160° C.

In addition to the anhydride hardeners described above, the curable epoxy resin composition of the present invention may optionally comprise additional hardeners (or curing agents) for promoting crosslinking of the curable epoxy resin composition. The additional hardener (or "second hardener") useful in the present invention may be used individually or as a mixture of two or more hardeners. The additional hardener may include for example any compound having an active group being reactive with the epoxy group of the epoxy resins.

The additional hardeners useful in the present invention may include for example nitrogen-containing compounds such as amines and their derivatives, oxygen-containing compounds such as carboxylic acid terminated polyesters, phenol novolacs, bisphenol-A novolacs, cresol novolacs, DCPD-phenol condensation products, brominated phenolic oligomers, amino-formaldehyde condensation products and phenol, sulfur-containing compounds such as polysulfides and polymercaptans, and mixtures thereof.

The curable epoxy resin composition of the present invention may optionally further contain one or more other additives. For example, the optional additives may include stabilizers, surfactants, flow modifiers, pigments or dyes, matting agents, degassing agents, fillers, flame retardants (for example, inorganic flame retardants such as aluminum trihydroxide, magnesium hydroxide, boehmite, halogenated flame retardants, and non-halogenated flame retardants such as phosphorus-containing materials), curing initiators, curing inhibitors, wetting agents, colorants or pigments, thermoplastics, processing aids, ultraviolet (UV) blocking compounds, fluorescent compounds, UV stabilizers, antioxidants, impact modifiers including thermoplastic particles, mold release agents and mixtures thereof. Fillers, mold release agents, wetting agents and their combinations are desirably used in the present invention. Examples of suitable fillers useful in the present invention can be selected from any inorganic filler such as silica, talc, quartz, mica, zinc peroxide, titanium dioxide, aluminum silicate and mixtures thereof. If present, the concentration of the inorganic filler is desirably from between 0 wt % to 30 wt %, between 0.01 wt % to 20 wt %, or between 0.1 wt % to 10 wt %, based on the total weight of the curable epoxy resin composition. In general, the amount of the optional additives (if present) in the curable epoxy resin composition should not compromise processability of the curable epoxy resin composition.

The curable epoxy resin composition of the present invention may be free of, or comprise a conventional toughening agent. Conventional toughening agent herein refers to a toughening agent that has a different structure with the Anhydride Reaction Product described above. The conventional toughening agents may include, for example, rubber compounds, block copolymers, polyols (including the unreacted polyol when present in the Anhydride Reaction Product described above), and mixtures thereof. Representative examples of the conventional toughening agents may include linear polybutadiene-polyacrylonitrile copolymers, oligomeric polysiloxanes, organopolysiloxane resins, carboxyl-terminated butadiene, carboxyl-terminated butadiene nitrile rubber (CTBN), polysulfide-based toughening agents, amine-terminated butadiene nitrile, polythioethers; and mixtures thereof. Examples of polyol toughening agents may include those polyols which are used to prepare the Anhydride Reaction Product described above. Total amount of the conventional toughening agent in the curable epoxy resin composition, may be desirably less than 5 wt %, less than 3 wt %, less than 1 wt %, less than 0.1 wt %, less than 0.08 wt %, less than 0.05 wt %, or even zero wt %. More preferably, total amount of the polyol in the curable epoxy resin composition is less than 0.08 wt %, less than 0.05 wt %, or even zero wt %. Wt % of the conventional toughening agent is based on the total weight of the curable epoxy resin composition. If the concentration of the conventional toughening agent is higher than 5 wt %, the curable epoxy resin composition may phase separate within 8 hours at 25° C. after mixing.

The curable epoxy resin composition of the present invention is prepared by admixing (a) a cycloaliphatic epoxy resin, (b) an oxazolidone ring-containing epoxy resin, (c) a reaction product of (i) an anhydride compound and (ii) a polyol, and (d) an anhydride hardener. Other optional components including for example a catalyst, an additional epoxy resin, an additional hardener, a conventional toughening agent or other optional additives may also be added, as described above. Components of the curable epoxy resin composition of the present invention may be admixed in any order to provide the curable epoxy resin composition of the present invention. Any of the above-mentioned optional components, for example fillers, may also be added to the composition during the mixing or prior to the mixing to form the composition.

The curable epoxy resin composition of the present invention desirably has a viscosity of less than about 4,000 mPa·s, less than about 3,500 mPa·s, less than about 3,000 mPa·s, or even less than about 1,750 mPa·s, as determined by ASTM D-2196 at 25° C. If the viscosity of curable epoxy resin composition is higher than 4,000 mPa·s, the processability of the curable epoxy resin composition may be compromised and not suitable for pultrusion process.

The components of the curable epoxy resin composition of the present invention have sufficient compatibility with each other, so that the composition exhibits no phase separation for at least eight hours at 25° C. after mixing. Upon curing, the curable epoxy resin composition of the present invention surprisingly exhibits higher flexural stress, flexural strain and/or tensile elongation than incumbent epoxy resin compositions that do not contain component (b) and/or (c). In particular, the tensile elongation is desirably 2% or more, 2.1% or more, or even 2.2% or more. At the same time, the curable epoxy resin composition upon curing has a $T_g$ of 160° C. or higher, 180° C. or higher, 200° C. or higher, or even 220° C. or higher.

Applications of the curable epoxy resin composition of the present invention include for example fiber reinforced composites made from various application methods including filament winding, pultrusion, resin transfer molding, vacuum assisted infusion and prepreg process. Another application area is in electrical insulation and encapsulation by application methods including casting, potting and automatic pressurized gelation (APG). The curable epoxy resin composition can also be used as potting material for road pavement and civil engineering. By adequate application methods like spray, roller or dip, the curable epoxy resin composition can also be used as coatings for a great variety of end uses including ship, marine containers, machinery, structural steel frames, and automotives.

The composite of the present invention comprises a reinforcing fiber embedded in a thermoset resin, wherein the thermoset resin is a reaction product of the curable epoxy resin composition described above. Preferably, the reinforcing fiber is a continuous reinforcing fiber.

Generally, the composite of the present invention may include for example a plurality of reinforcing fibers embedded in a thermoset resin. The composite may comprise for example fiber tows embedded in a thermoset resin matrix. The composite of the present invention may comprise one single type of reinforcing fiber or combination of two or more different types of reinforcing fibers.

The reinforcing fiber herein may be selected from synthetic or natural fibers. The reinforcing fibers useful in the present invention may be in the forms of, for example, woven fabric, cloth, mesh, web, fiber tows; or in the form of a cross-ply laminate of unidirectionally oriented parallel filaments. The reinforcing fiber may include one or more fibers such as carbon fibers, graphite fibers, boron fibers, quartz fibers, aluminum oxide-containing fibers, glass fibers, cellulose fibers, silicon carbide fibers or silicon carbide fibers containing titanium, and mixtures thereof. The reinforcing fibers desirably include carbon fibers, glass fibers (for example, E glass, S glass, S-2 glass, C glass, boron free E glass or E-CR glass), a combination of carbon fibers and a glass fibers, fibers comprising carbon in combination with other materials such as glass or mixtures thereof. Suitable commercially available fibers useful in the present invention include for example organic fibers such as KEVLAR™ from DuPont (KEVLAR is a trademark of DuPont); aluminum oxide-containing fibers, such as NEXTEL™ fibers from 3M (NEXTEL is a trademark of 3M Company); silicon carbide fibers, such as NICALON™ fibers from Nippon Carbon (NICALON is a trademark of Nippon Carbon Company Ltd.); carbon fibers, such as TORAYCA™ fibers from Toray Industries (TORAYCA is a trademark of Toray Industries); glass fiber, such as ADVANTEX™ fiber from Owens Corning (ADVANTEX is a trademark of Owens Corning).

The composite of the present invention may comprise 65 wt % or more, 70 wt % or more, or even 75 wt % or more reinforcing fibers. At the same time, the composite may comprise 95 wt % or less, 90 wt % or less, or even 85 wt % or less reinforcing fibers. Wt % of the reinforcing fibers is based on total composite weight.

Composites of the present invention may be formed for example by curing the curable epoxy resin composition with a continuous reinforcing fiber as described above to form a thermoset resin and a continuous reinforcing fiber embedded within the thermoset resin matrix.

Curing the curable epoxy resin composition may be carried out, for example, at a temperature of at least 30° C. up to 250° C., for predetermined periods of time which may be from minutes up to hours, depending on the curable epoxy resin composition, hardener, and catalyst, if used. Curing of the curable epoxy resin composition of the present invention may be carried out for example at a temperature in a range of from 60° C. to 240° C., from 100° C. to 230° C., or even from 120° C. to 220° C., for predetermined periods of time of from minutes up to hours. Optionally, post-treatments may also be used herein, and such post-treatments may be carried out at a temperature between 100° C. and 250° C.

Curing the curable epoxy resin composition may be staged to prevent exotherms. Staging, for example, includes curing for a period of time at a first temperature followed by curing for a period of time at a second temperature higher than the first temperature. Staged curing may include two, three or more curing stages, and may commence at temperatures below 180° C. and can be commenced at temperatures below 150° C. For example, a three-stage curing of the curable epoxy resin composition is used.

Suitable processing techniques for preparing the composite of the present invention include prepreg processes, laminating, casting, filament winding, and preferably pultrusion processes. A suitable pultrusion process for preparing the composite comprises the steps of: pulling a continuous reinforcing fiber, contacting the reinforcing fiber with the curable epoxy resin composition, and curing the curable epoxy resin composition while being in contact with the continuous reinforcing fiber. Two or more different types of reinforcing fibers may be used during pultrusion.

The composite of the present invention may have different structures and/or different shapes depending on the applications in which the composite is used. For example, the composite may be a core having an outer sheath and an inner core generally surrounded by the outer sheath for cables, or a rod or pole for insulating composites. The composite of the present invention may be useful in many applications, such as composite cords for suspension bridges, overhead cableway and cables, insulators suitable for power transmission and distribution such as tension tower insulators, suspension tower insulators and post insulators for railways.

EXAMPLES

The following examples illustrate embodiments of the present invention. All parts and percentages are by weight unless otherwise indicated.

ERL™ 4221 resin (ERL is a trademark of The Dow Chemical Company) is a cycloaliphatic epoxy resin mixture, having about 85 weight percent 7-oxabicyclo[4.1.0] heptane-3-carboxylic acid and 7-oxabicyclo[4.1.0]hept-3-ylmethylester, the remainder being about 10 weight percent soluble oligomer, and 5 weight percent monoepoxides of 3-cyclohexenylmethyl-3-cyclohexene carboxylate and 3-cyclohexen-1-ylmethyl ester. commercially available from The Dow Chemical Company. ERL 4221 resin has an epoxy equivalent weight (EEW) of 136.

D.E.R.™ 858 resin (D.E.R. is a trademark of The Dow Chemical Company) is a polymer of bisphenol A, epichlorohydrin and methylenediphenylene (which is an oxazolidone ring-containing epoxy resin), commercially available from The Dow Chemical Company.

Nardic maleic anhydride (NMA) and methyltetrahydrophthalic anhydride (MTHPA) are available from Polynt Chemical Company.

VORANOL™ 8000LM polyol (VORANOL is a trademark of The Dow Chemical Company) is a polypropylene glycol, with a molecular weight of 8000 Dalton and a real functionality close to 2, available from The Dow Chemical Company.

FORTEGRA™ 100 amphiphilic block copolymer is a poly(ethylene oxide)-b-poly(butylene oxide)-b-poly(ethylene oxide) (PEO-b-PBO-b-PEO). The poly(ethylene oxide) block segment of the block copolymer is an epoxy miscible block, and the poly(butlyene oxide) block segment of the block copolymer is an epoxy immiscible block. This amphiphillic block copolymer has a molecular weight of about 3,000 and is available from The Dow Chemical Company (FORTEGRA is a trademark of The Dow Chemical Company).

"2E4MI" stands for 2-ethyl-4-methylimidazole and is a catalyst available from Shikoku Chemicals.

EK900 is a benzyldimethylamine catalyst available from Jiangdu Dajiang Chemical Co. Ltd.

The following standard analytical equipment and methods are used in the Examples.

Viscosity

Viscosity of an epoxy resin composition is measured in accordance with ASTM D-2196 at 25° C.

Acid Value

The acid value of a sample is defined as milligrams potassium hydroxide per gram sample (mg KOH/g). To determine acid value, a weighed sample is completely dissolved in acetone to form a sample solution. Then, excessive KOH standard solution (concentration: 0.1 molar per liter (mol/L)) is added into the sample solution using a pipette and stirred for 10 minutes. Then KOH is titrated with HCl solution (concentration: 0.1 mol/L) by a Mettler DL-55 Titrator until the solution shows neutral. The acid value ($X_1$) of the sample is measured as $$X_1=(C_1V_1-C_2V_2)*56.11/m$$

where in the above equation, $C_1$ refers to the concentration of KOH solution, mol/L; $V_1$ refers to the volume of KOH solution added into the sample solution, mL; $C_2$ refers to the concentration of HCl solution, mol/L; $V_2$ refers to the volume of HCl solution used to titrate KOH, mL; and m refers to the weight of the sample, grams.

Glass Transition Temperature

Glass transition temperature ($T_g$) is measured by differential scanning calorimetry (DSC). $T_g$ measurement by DSC is with 30-250° C., 10 degree Celsius per minute (° C./min); 30-300° C., 10° C./min; 2 cycles. A 5-10 milligram (mg) sample is analyzed in an open aluminum pan on a TA Instrument DSC Q2000 fitted with an auto-sampler under nitrogen.

Mechanical Properties

Tensile properties are measured using an Instron 5566 in accordance with ISO 527 (test speed: 2 millimeter per minute (mm/min), gauge length: 50 mm).

Flexural properties are measured using an Instron 5566 in accordance with ISO 178 (test speed: 2 mm/min, support span: 16*D mm, where D refers to the thickness of samples).

Compatibility Evaluation

Compatibility is determined by mixing ingredients, such as the ingredients described in Table 1, respectively, to form the curable epoxy resin compositions of Example 1-2, Comparative Example A and C. Each epoxy resin composition is stirred by a disperser at 900 revolutions per minute (rpm) for 10 minutes. The resultant homogeneous mixture is poured into a bottle, then the bottle is left sitting at 25° C. for 8 hours. After that, the mixture is visually observed. If the mixture shows no signs of phase separation by visual observation, the components of such epoxy resin composition is deemed to have sufficient compatibility with each other. Otherwise, if the mixture shows phase separation, it means the components of such epoxy resin composition do not have sufficient compatibility with each other.

Synthesis Example 1—Preparation of Adduct (I)

100 grams (g) of NMA, 898 g of VORANOL 8000LM polyol and 2 g of EK900 benzyldimethylamine catalyst were charged into a flask purged with nitrogen. A mixture obtained was heated to 110° C. and maintained at 110±5° C. for 2 hours, while stirring at 200 rpm. A reaction product (named as "Adduct (I)") was then obtained, which had ester groups as confirmed by Fourier Transform Infrared (FT-IR) spectra (1735-1738 cm$^{-1}$). The Adduct (I) had a viscosity of 4,700 to 5,000 mPa·s and an acid value of 50 to 55 mg KOH/g.

Synthesis Example 2—Preparation of Adduct (II)

100 g of MTHPA, 898 g of FORTEGRA 100 copolymer and 2 g of EK900 catalyst were charged into a flask purged with nitrogen A mixture obtained was heated to 110° C. and maintained at 110±5° C. for 2 hours, while stirring at 200 rpm. A reaction product (named as "Adduct (II)") was then obtained, which had ester groups as confirmed by FT-IR spectra (1735-1738 cm$^{-1}$). The Adduct (II) had a viscosity of 8,500 to 9,000 mPa·s and an acid value of 50 to 55 mg KOH/g.

Examples 1-2 and Comparative Examples A-C

Epoxy resin compositions were formed by mixing the ingredients described in Table 1. The epoxy resin compositions were stirred by a disperser at 900 rpm for 10 minutes, followed by vacuum degassing at 60° C. until no bubbles were visible. The degassed mixtures were poured into preheated glass molds for curing. Castings were made by curing the molds containing the compositions. The castings were cured in an oven at 90° C. for 2 hours, at 140° C. for 2 hours, and at 220° C. for 2 hours. Cured castings were slowly cooled down to room temperature (about 23° C.) in the oven.

The compatibility of the ingredients described in Table 1 was determined by the compatibility evaluation method described above. The results of this compatibility evaluation are described in Table 1. As shown in Table 1, epoxy resin compositions of the present invention (Examples 1-2) exhibited no phase separation for at least 8 hours at 25° C. after mixing, which indicates sufficient compatibility between components of the epoxy resin compositions. In contrast, epoxy resin compositions of Comparative Examples A and D phase separated within 8 hours at 25° C. after mixing.

The mechanical properties of the cured castings prepared as described above were measured in accordance with the testing methods described above. The results of the mechanical properties of the cured castings are shown in Table 2.

As shown in Table 2, cured castings of Examples 1-2 showed significantly higher flexural stress, flexural strain and tensile elongation, comparable or even better tensile strength, and comparable $T_g$, as compared to cured castings of Comparative Examples A-C. Although the cured castings of Examples 1-2 showed slightly decreased Young's flexural modulus and Young's modulus as compared to some of the cured castings of Comparative Examples, the Young's flexural modulus and Young's modulus of the present invention were still acceptable for industrial applications.

TABLE 1

| | Example 1 | Example 2 | Comparative Example A | Comparative Example B | Comparative Example C | Comparative Example D |
|---|---|---|---|---|---|---|
| ERL 4221 epoxy, g | 80 | 80 | 80 | 100 | 100 | 80 |
| DER 858 epoxy, g | 20 | 20 | 20 | 0 | 0 | 20 |
| NMA, g | 96.1 | 96.1 | 97.7 | 113 | 113 | 97.7 |
| 2E4MI, g | 2.3 | 2.3 | 2.3 | 2.3 | 2.3 | 2.3 |
| VORANOL 8000LM polyol, g | 0 | 0 | 15 | 15 | 0 | 0 |
| FORTEGRA 100 copolymer, g | 0 | 0 | 0 | 0 | 0 | 15 |
| Adduct (I), g | 16.6 | 0 | 0 | 0 | 15 | 0 |
| Adduct (II), g | 0 | 16.6 | 0 | 0 | 0 | 0 |
| Viscosity of composition at 25° C., mPa·s | 3250-3260 | 3270-3280 | 3000-3050 | 750-760 | 800-810 | 3100-3110 |
| Sufficient compatibility | Yes | Yes | No | Yes | Yes | No |

TABLE 2

| Properties | Example 1 | Example 2 | Comparative Example A | Comparative Example B | Comparative Example C |
|---|---|---|---|---|---|
| $T_g$, ° C. | 222.5 | 223.1 | 222.3 | 221.1 | 222.1 |
| Flexural Stress at Break, Megapascals (MPa) | 90 | 81 | 68 | 72 | 68 |
| Flexural Strain At Break, % | 3.9 | 4.18 | 3.2 | 2.8 | 2.7 |
| Young's Flexural Modulus, MPa | 2547 | 2305 | 2372 | 2708 | 2671 |
| Tensile Strength at Break, MPa | 46 | 44 | 37 | 43 | 37 |
| Elongation At Break, % | 2.39 | 2.46 | 1.72 | 1.89 | 1.67 |
| Young's Modulus, MPa | 2404 | 2213 | 2330 | 2330 | 2577 |

The invention claimed is:

1. A curable epoxy resin composition comprising: (a) a cycloaliphatic epoxy resin, (b) an oxazolidone ring-containing epoxy resin, (c) a reaction product of (i) an anhydride compound and (ii) a polyol, and (d) an anhydride hardener; wherein the reaction product (c) contains a carboxylic acid group and has an acid value of 40 to 60 mg KOH/g; wherein the polyol is an aliphatic polyol having an average molecular weight of 6,000 grams per mole or more; and wherein the composition exhibits no phase separation for at least eight hours at 25° C. after mixing.

2. A curable epoxy resin composition comprising: (a) a cycloaliphatic epoxy resin, (b) an oxazolidone ring-containing epoxy resin, (c) a reaction product of (i) an anhydride compound and (ii) a polyol, and (d) an anhydride hardener; wherein the reaction product (c) contains a carboxylic acid group and has an acid value of 40 to 60 mg KOH/g; wherein the polyol is an amphiphilic block copolymer having at least one hydroxyl functional group and having an average molecular weight of from 4,000 to 16,000 grams per mole; and wherein the composition exhibits no phase separation for at least eight hours at 25° C. after mixing.

3. The composition of claim 1 or claim 2, comprising from 1 to 50 weight percent of the reaction product (c), where weight percentage is based on the total weight of the curable epoxy resin composition.

4. The composition of claim 1 or claim 2, wherein the curable epoxy resin composition comprises from 50 to 95 weight percent of the cycloaliphatic epoxy resin and from 5 to 50 weight percent of the oxazolidone ring-containing epoxy resin, where weight percentage is based on the total epoxy resin weight in the composition.

5. The composition of claim 1 or claim 2, wherein the oxazolidone ring-containing epoxy resin is a reaction product of an aromatic epoxy resin and an isocyanate compound.

6. The composition of claim 1 or claim 2, wherein the anhydride compound or the anhydride hardener is independently selected from nardic maleic anhydride (NMA); methyltetrahydrophthalic anhydride (MTHPA); methylhexahydrophthalic anhydride (MHHPA); methyl-(endo)-5-norbornene-2,3-dicarboxylic anhydride; hexahydrophthalic anhydride (HHPA); tetrahydrophthalic anhydride (THPA); pyromellitic dianhydride; ciscyclopentanetetracarboxylic acid dianhydride; hemimellitic anhydride; trimellitic anhydride; naphthalene-1,8-dicarboxylic acid anhydride; phthalic anhydride; dichloromaleic anhydride; dodecenylsuccinic anhydride; glutaric anhydride; maleic anhydride; succinic anhydride and mixtures thereof.

7. The composition of claim 1 or claim 2, further comprising an additional epoxy resin selected from diglycidyl ether of bisphenol A and derivatives, diglycidyl ether of bisphenol F and derivatives, phenol novolac epoxy resin, and mixtures thereof.

8. The composition of claim 1 or claim 2, wherein the curable epoxy resin composition comprises 0.08 weight percent or less of a polyol, where weight percentage is based on the total weight of the curable epoxy resin composition.

9. A process for preparing the curable epoxy resin composition of claim 1 or claim 2, comprising admixing (a) a cycloaliphatic epoxy resin, (b) an oxazolidone ring-containing epoxy resin, (c) a reaction product of (i) an anhydride compound and (ii) a polyol, and (d) an anhydride hardener.

10. A composite comprising a reinforcing fiber embedded in a thermoset resin, wherein the thermoset resin is a reaction product of the curable epoxy resin composition of claim 1 or claim 2.

11. The composite of claim 10, wherein the reinforcing fiber is a continuous fiber.

* * * * *